May 1, 1934.　　　　N. A. CARTER　　　　1,956,549
VEHICLE WHEEL MOUNTING
Filed Feb. 27, 1932　　　4 Sheets-Sheet 4
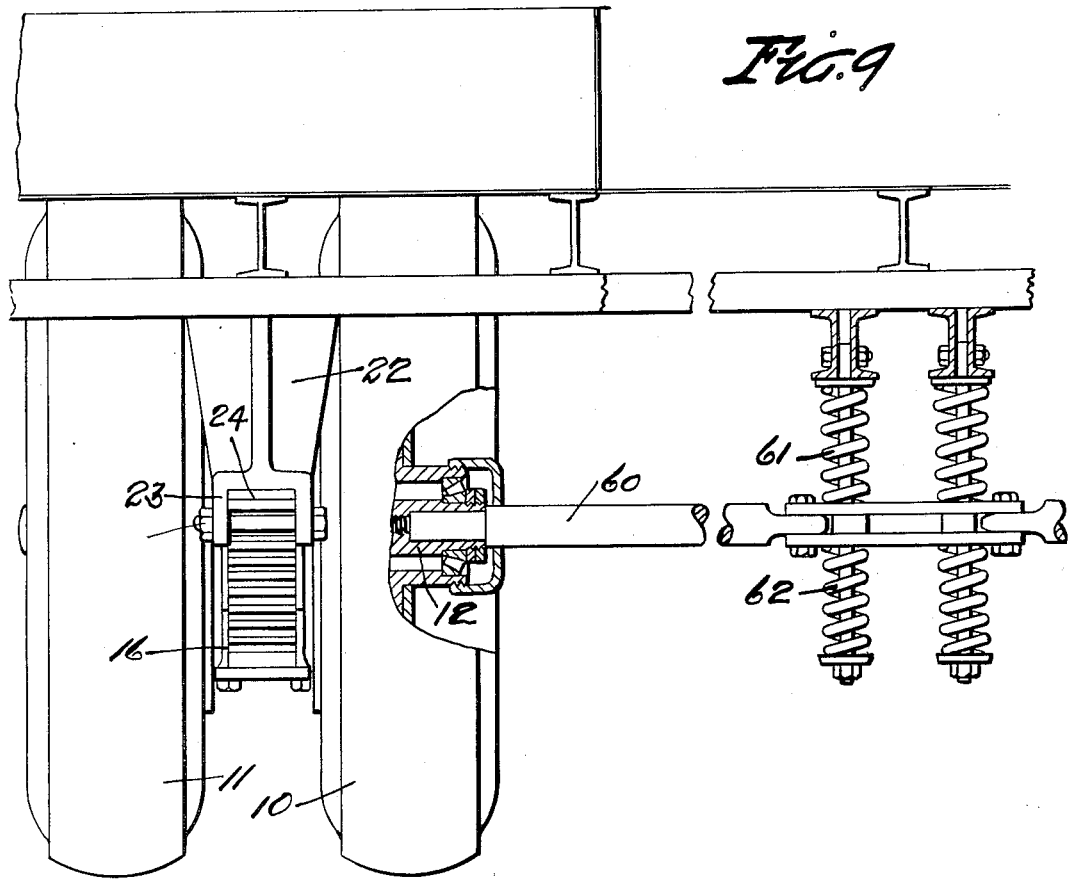
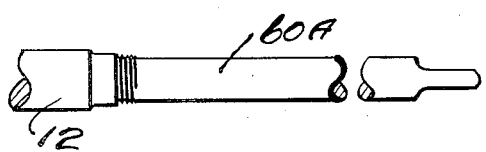
INVENTOR
Nathan A. Carter
by J. H. Weatherford
ATTY.

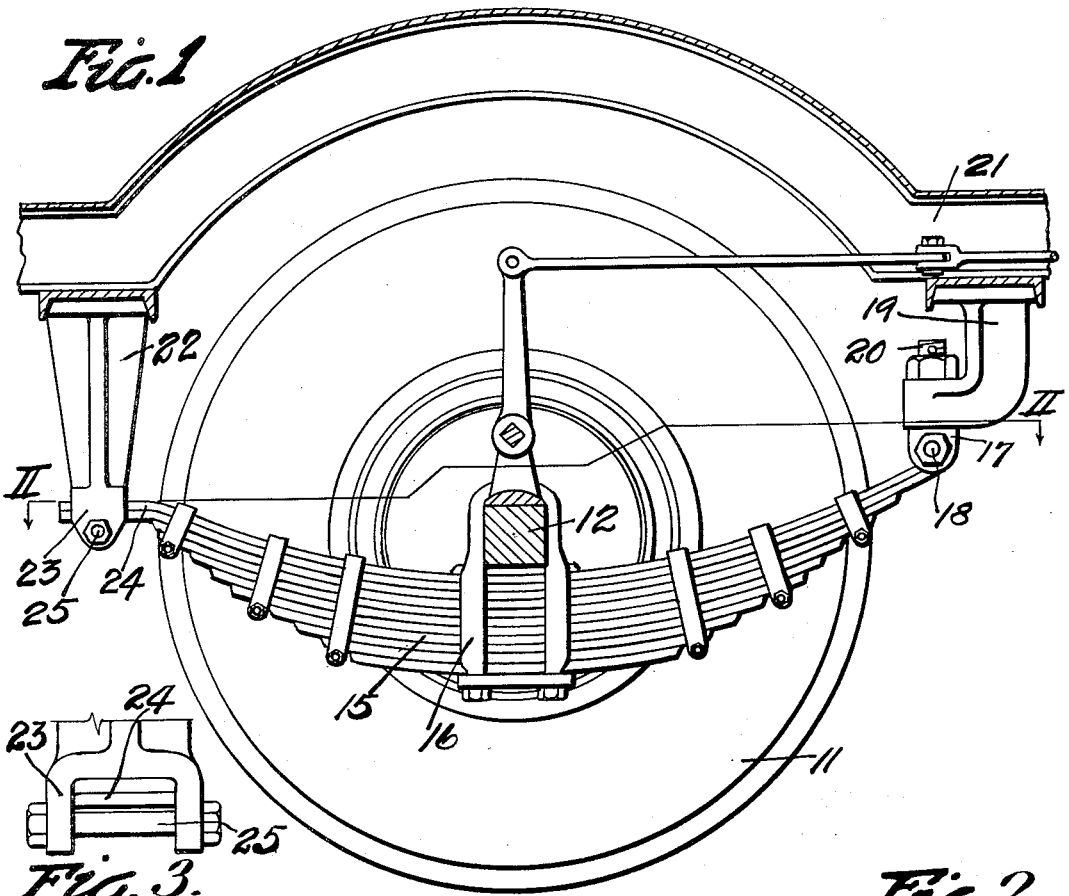
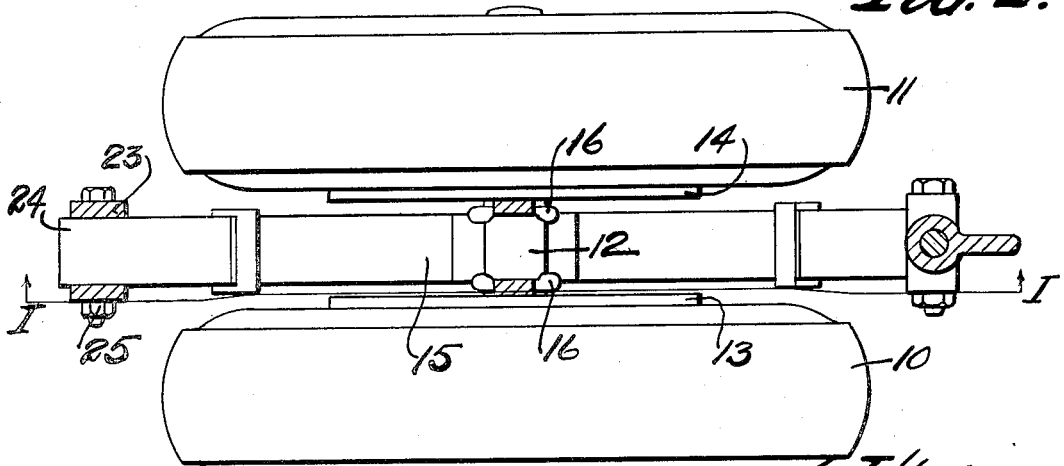

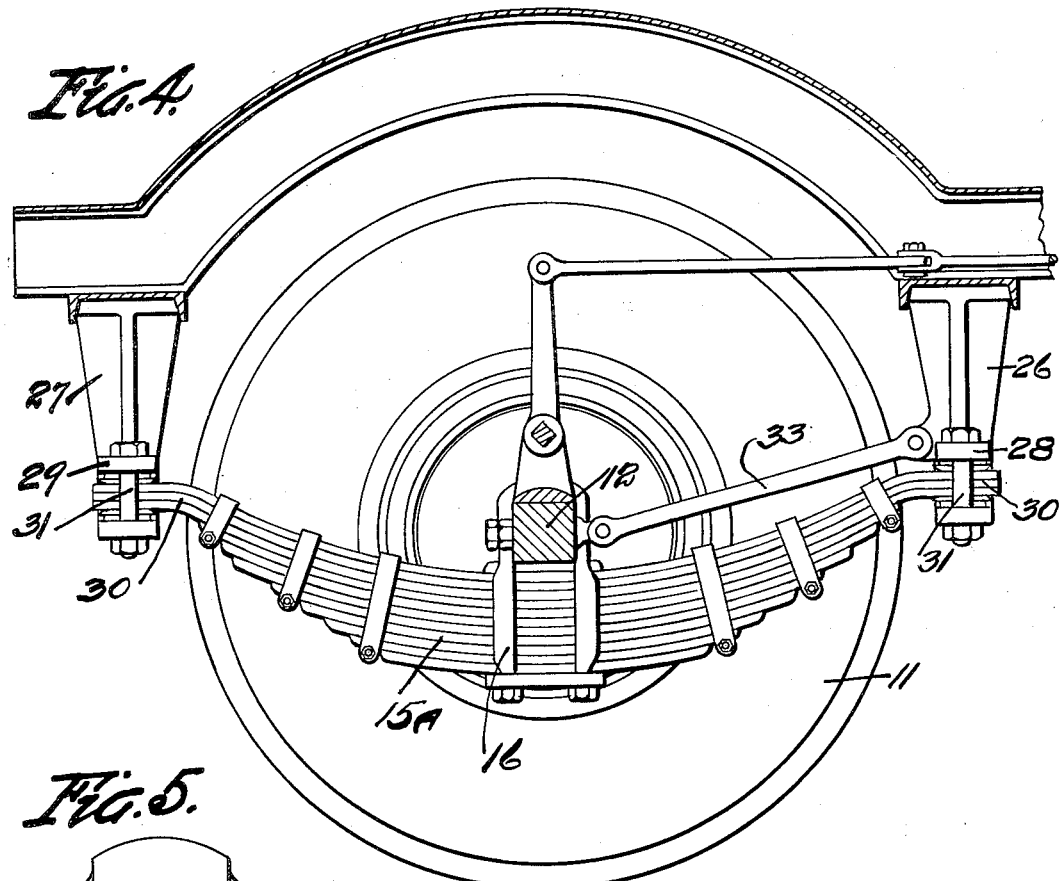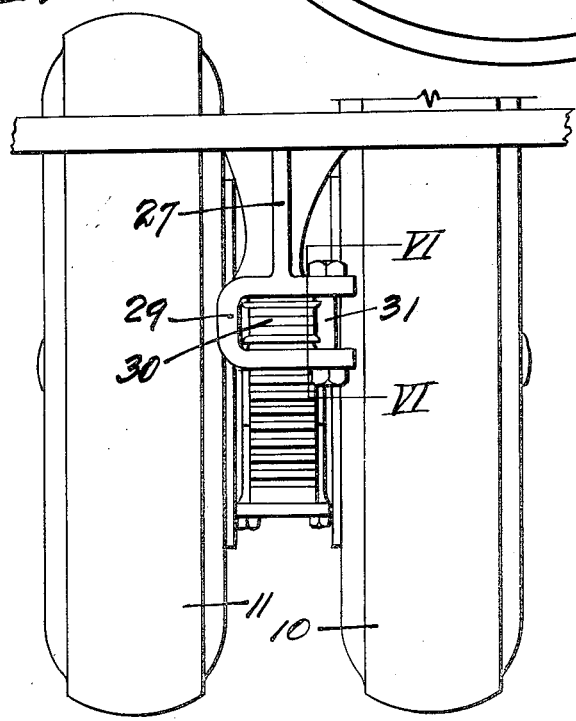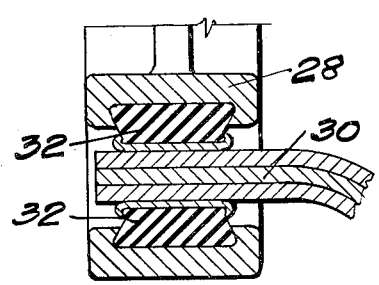

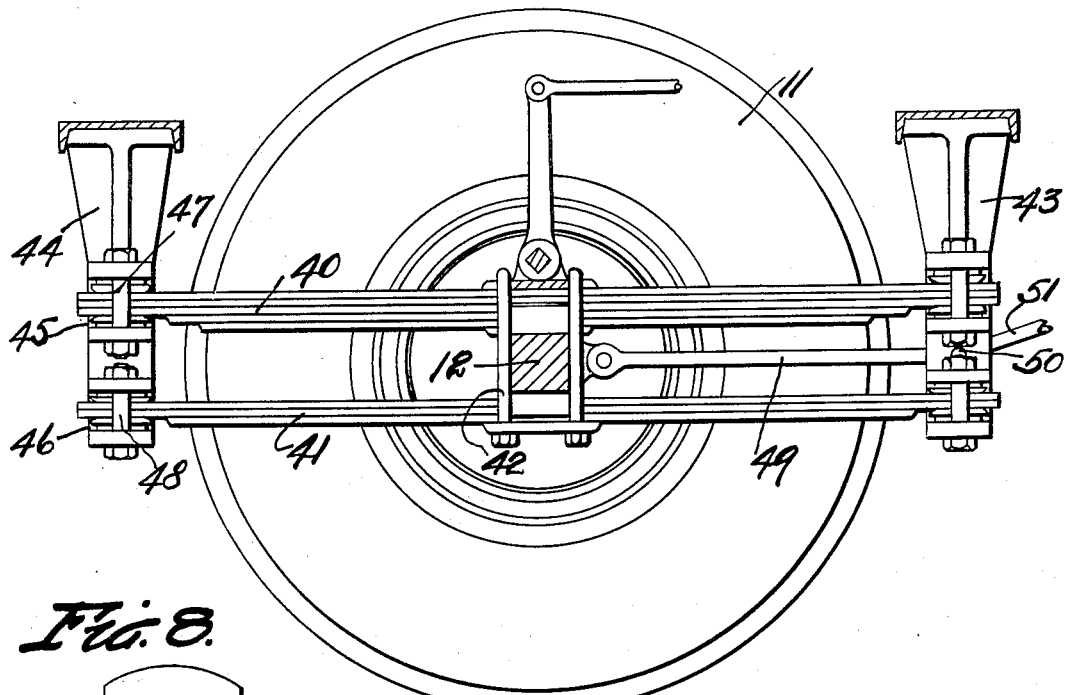
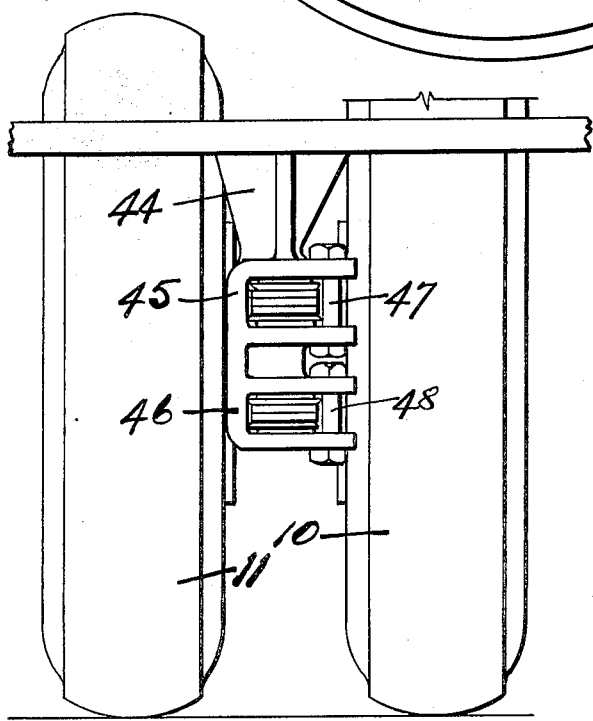

Patented May 1, 1934

1,956,549

UNITED STATES PATENT OFFICE 1,956,549

VEHICLE WHEEL MOUNTING

Nathan A. Carter, Memphis, Tenn.

Application February 27, 1932, Serial No. 595,485

5 Claims. (Cl. 267—56)

This invention relates to improvements in wheel mountings for vehicles in which the load is carried by pairs of wheels on each side of the vehicle instead of by a single wheel on each side, and particularly to a variation in the form of mountings such as are shown in my pending application Serial No. 580,068, filed Dec. 10, 1931.

That application was directed broadly to a wheel carrier irrespective of type, and specifically to a carrier which in itself was rigid and was flexibly attached to the body structure of the vehicle. The present application is directed to a carrier structure which in itself is flexible and to a device in which the lateral flexibility is accomplished through the instrumentality of the resiliency of the carrier.

The objects of the present invention are:

To provide for independent rotation of the wheels;

To provide means permitting the wheels of each pair to adjust themselves transversely to conform to variations in road crowns or the like;

To provide means for resiliently resisting transverse oscillation;

To provide means for limiting such oscillation; and

To generally improve the detail and construction of dual wheel mountings.

The means by which the foregoing and other objects are accomplished and the manner of their accomplishment will readily be understood from the following specification on reference to the accompanying drawings, in which:

Fig. 1 is a vertical sectional side elevation taken as on the line I—I of Fig. 2;

Fig. 2 is a sectional plan taken as on the line II—II of Fig. 1;

Fig. 3 is an enlarged fragmentary end view of one of the spring supporting brackets, and showing an end of the spring therein;

Fig. 4 is a sectional side elevation corresponding to Fig. 1, showing a modified form of the structure;

Fig. 5 is an end elevation of the structure shown in Fig. 4;

Fig. 6 is an enlarged fragmentary section taken as on the line VI—VI of Fig. 5;

Fig. 7 is a sectional side elevation similar to Figs. 1 and 3, showing a further modification of the beam structure;

Fig. 8 is an end elevation of the structure shown in Fig. 7;

Fig. 9 is a sectional end elevation partially in section showing a means for positively limiting the oscillatory movement of the structure; and Fig. 10 is a fragmentary elevation showing a modified construction of the motion limiting arm.

Referring now to the drawings in which the various parts are indicated by numerals, 10, 11 are dual wheels which independently are rotatably mounted on opposite ends of a short axle 12, preferably one of the usual or well known types of ball or roller bearing being used as is common to reduce rotational resistance. The wheels are each provided with a brake drum 13, 14 respectively, the two brake shoes therefor being jointly operated as described in my previous application above mentioned.

The axle 12 is disposed at right angles to a longitudinally disposed spring 15, to which it is secured as by U shaped bolts or clips 16, the spring serving as a flexible or resilient beam for carrying the axle. In Fig. 1, the forward end of the spring is secured in a clip 17 as by a bolt 18. The clip 17 is secured to the bracket 19 for pivotal movement about a vertical axis as by a bolt 20. The bracket 19 depends from and is secured to the frame 21 of the vehicle body as by welding.

The rear end of the spring 15 is carried by a bracket 22 which is secured to and depends also from the body frame. The lower end of this bracket 23 is fork shaped to provide a socket through which one or more of the upper leaves 24 of the spring projects (two being shown), and in which the leaves rest being held against a seat formed on the bottom end of the bracket and against removal by a bolt 25. In this construction the axle is positioned and held relatively to the body by hinge action of the spring around the bolt 18, while the rear end of the spring slides forward and backward under loading or use in the fork of the rear bracket. Removal of the bolt 25 permits disconnection of the rear end of the spring and swinging of the entire wheel and spring structure outward around the vertical bolt 20 as an axis.

In Fig. 4, both the forward and rear ends of the spring 15A are carried by brackets 26, 27 respectively which brackets have horizontally disposed forks 28, 29 in which one or more of the upper leaves 30 (three being shown), of the spring are disposed. These leaves are held against removal by bolts 31. Preferably as best shown in the enlarged view Fig. 6, metal faced rubber shock plates 32 are interposed in these forks between the leaves of the spring and the fork jaws. In this construction the ends of the spring slide forward and backward through the forks of the bracket under varying conditions of load and use. The springs may be removed laterally from the forks on removal of the bolts by which they are confined. In this construction in order to maintain the spring in proper relation to the brackets and axle in the proper position a radius rod 33 is pivotally connected to the bracket 26 and to the axle 12.

In Figs. 7 and 8 a still further modification is shown in which the axle is secured to a spring structure, part of which 40 is above the axle and part 41 therebelow. This spring structure as before, is rigidly bolted to the axle as by U bolts 42. In this structure both the front bracket 43 and the rear bracket 44 are provided with a dual set of forks 45 for the upper portion of the spring and 46 for the lower portion thereof. These portions are held in the forks respectively, by the bolts 47 and 48. In this form of the structure a radius rod 49 extends forward and is connected by a pin 50 to the bracket 43, from which pin if desired a reach rod 51 may extend upward and forward and be connected to a forward portion (not shown) of the body structure. In this form of the device the ends of the springs slide back and forth in the bracket forks as previously just described, and removal of the retaining bolts similarly allows their lateral removal.

In all of the before mentioned descriptions the sole means for retaining the axle in a horizontal position is the resistance to torsion of the spring structure. In Fig. 9, a portion of the wheel 10 is broken away to show a counterbored or hollow axle into which an extension member 60 is secured. The inner end of this member adjacent the center of the vehicle body is disposed between upper and lower compression springs 61, 62, which springs dampen any oscillatory rotation of the axle in a vertical plane, and eventually definitely limit such movement.

In Fig. 10, this extension member 60A is shown as an integral part of the axle. It will be understood that to remove the wheel 10 the extension 60 may be disconnected but that in the case of the solid extension member 60A it would be necessary in removing the wheel, to move it to the extreme inner end of this member before the wheel would be free.

Under ordinary use the wheels 10 and 11 will readily conform themselves to varying road crowns by torsional deformation of the spring structure and would also similarly conform themselves to minor inequalities in the road surface. However, should a deep hole be encountered by one wheel torsional resistance of the spring would transfer the load to the other wheel until the hole is passed.

In case of a puncture the structure will twist until torsional resistance transfers the entire load to the undamaged wheel and permit such undamaged wheel to function until such times as repairs could be made. In any of these cases if the extension member be used the ultimate twist of the structure would be limited by such member rather than by the torsion of the springs.

To remove or replace an outer tire the truck may be jacked up and the wheel be directly removed as is usual. To remove or replace an inner tire these structures make it possible to jack up the truck body, and in the form shown in Fig. 1, disconnect the retaining bolt 25 and turn the entire wheel and spring structure around the bolt 20 as an axis until the inner wheel is brought into accessible position.

To remove the inner wheel in the form shown in Figs. 4 and 7 the bolts 31, or 47 and 48 as the case may be are removed and the entire wheel and spring structure are moved bodily outward until accessibility is had. In such form however, removal of the spring structure may be accomplished by disconnecting the radius rod and shifting the structure backward and forward to disconnect first one end and then the other without removing the bolts.

It will be understood that in case removal is to be accomplished by longitudinal shifting the slots need not have an open side.

It will further be understood that the details of construction are illustrative only and that only such limitations as are specifically introduced in a claim are to be therein construed.

Having described my invention, what I claim is:—

1. In a wheel mounting for vehicles, an elongated structure, an axle rigidly secured thereto intermediate the ends of said structure and projecting at each side thereof, a pair of wheels rotatably mounted on said axle at opposite sides of said structure, means detachably securing one end of said structure to the vehicle, vertically-disposed pivot means securing the other end of said structure to said vehicle and permitting pivotal movement of said structure in a horizontal plane, but both of said securing means opposing turning of said structure about its longitudinal axis, whereby the detachable end of said structure may be swung outward to afford access to the inner one of said wheels while tilting of said structure is prevented by said pivot means.

2. In a wheel mounting for vehicles, an elongated resilient structure having an axle rigidly secured between the ends thereof with a pair of wheels rotatably mounted on said axle at the respective sides of said structure, means detachably securing one end of said structure to the vehicle, vertically-disposed pivot means securing the other end of said structure to said vehicle and permitting pivotal movement of said structure in a horizontal plane, but both of said securing means opposing torsional movement of said structure about its longitudinal axis, whereby the detachable end of said structure may be swung outward to afford access to the inner one of said wheels, while tilting of said structure is prevented by said pivot means.

3. In a wheel mounting for vehicles, an elongated resilient structure having an axle rigidly secured between the ends thereof with a pair of wheels rotatably mounted on said axle at the respective sides of said structure, vertically-disposed pivot means securing one end of said structure to the vehicle for pivotal movement about a vertical axis, and means slidably but detachably securing the other end of said structure to said vehicle, both of said securing means opposing turning movement of said structure about its longitudinal axis, whereby the detachable end of said structure may be swung outward to afford access to the inner one of said wheels, while tilting of said structure is prevented by said pivot means.

4. In a wheel mounting for vehicles, a pair of brackets depending from the vehicle and spaced apart, one of said brackets having a horizontal seat at its lower end, a spring clip disposed at and seated against the lower end of said bracket, a vertically-disposed pin pivotally securing said clip to said bracket and preventing overturning of said clip, a horizontally-disposed pin carried by said clip, an elongated leaf spring spanning between said brackets, an axle rigidly secured transversely across said spring intermediate the ends thereof, a pair of wheels rotatably mounted on said axle, one on each side of said spring, said spring having one end hinged on said horizontal pin and its other end disposed beneath the other of said brackets and longitudinally slidable thereagainst, and removable means for slidably securing said end against said bracket and preventing turning of said end, whereby such slidable end may be released and said structure swung outward to permit access to the inner one of said wheels, while said structure is held against overturning movement.

5. In a wheel mounting for vehicles, an elongated leaf spring, an axle rigidly secured thereto intermediate the ends of said spring and projecting at each side thereof, a pair of wheels rotatably mounted on said axle at opposite sides of said spring, means detachably securing one end of said spring to the vehicle, vertically-disposed pivot means securing the other end of said spring to said vehicle and permitting pivotal movement of said spring in a horizontal plane, but both of said securing means opposing turning of said spring about its longitudinal axis, whereby the detachable end of said spring may be swung outward to afford access to the inner one of said wheels while tilting of said spring is prevented by said pivot means.

NATHAN A. CARTER.